(12) United States Patent
Smith et al.

(10) Patent No.: US 6,856,243 B2
(45) Date of Patent: Feb. 15, 2005

(54) METHOD AND APPARATUS FOR PEST DETERRENCE

(75) Inventors: Blaine M. Smith, Portland, OR (US); Timothy M. Simon, San Francisco, CA (US)

(73) Assignee: Tim Simon, Inc., San Francisco, CA (US)

( * ) Notice: Subject to any disclaimer, the term of this patent is extended or adjusted under 35 U.S.C. 154(b) by 0 days.

(21) Appl. No.: 10/773,498

(22) Filed: Feb. 6, 2004

(65) Prior Publication Data

US 2004/0169585 A1 Sep. 2, 2004

Related U.S. Application Data

(62) Division of application No. 09/844,065, filed on Apr. 26, 2001, now Pat. No. 6,710,705.

(51) Int. Cl.[7] .................................................. G08B 3/10
(52) U.S. Cl. .................... 340/384.2; 340/511; 340/520; 340/524
(58) Field of Search ............................ 340/384.2, 511, 340/524, 520

(56) References Cited

U.S. PATENT DOCUMENTS

| | | | |
|---|---|---|---|
| 3,599,195 A | * | 8/1971 | Boyko ........................ 340/561 |
| 4,658,386 A | | 4/1987 | Morris |
| 4,669,424 A | | 6/1987 | Bianco et al. |
| 4,725,993 A | | 2/1988 | Owen et al. |
| 4,748,938 A | | 6/1988 | Owen |
| 4,965,552 A | * | 10/1990 | Price et al. ................. 340/566 |
| 4,969,418 A | | 11/1990 | Jones |
| 5,009,192 A | | 4/1991 | Burman |
| 5,214,411 A | | 5/1993 | Herbruck |
| 5,257,012 A | | 10/1993 | Metcalf |
| 5,450,063 A | | 9/1995 | Peterson et al. |
| 5,463,595 A | * | 10/1995 | Rodhall et al. ............... 367/93 |
| 5,499,012 A | * | 3/1996 | Tracy et al. ................. 340/514 |
| 5,805,063 A | * | 9/1998 | Kackman ............... 340/539.17 |
| 5,854,588 A | * | 12/1998 | Dockery ..................... 340/541 |
| 5,892,446 A | | 4/1999 | Reich |
| 5,898,368 A | * | 4/1999 | Handley et al. ............. 340/514 |
| 6,309,090 B1 | * | 10/2001 | Tukin ......................... 362/276 |
| 2004/0140892 A1 | * | 7/2004 | Hanood ....................... 340/511 |

* cited by examiner

*Primary Examiner*—Daniel Wu
*Assistant Examiner*—Son Tang
(74) *Attorney, Agent, or Firm*—James F. Hann; Haynes Beffel & Wolfeld LLP

(57) ABSTRACT

A pest deterrent device attracts the attention of a pest with ultrasonic noise and then produces a series of flashes to drive off the pest. In one embodiment, the device continuously produces ultrasound, changing the ultrasound when a pest is detected. In another embodiment, the device does not produce ultrasound until a pest is detected. In a further embodiment, the flash charging circuit is used to modulate the ultrasound while the flash is operated. In a particular embodiment, four ultrasonic speakers are arranged in a series-parallel configuration with a total capacitance of about 0.2 micro-Farads achieve 120 dB of sound output with a supply voltage of about 12–18 V.

8 Claims, 5 Drawing Sheets

METHOD AND APPARATUS FOR PEST
DETERRENCE

CROSS REFERENCE TO RELATED APPLICATIONS

This is a divisional application of U.S. pat. application Ser. No. 09/844,065 filed 26 Apr. 2001 now U.S. Pat. No. 6,710,705, the disclosure of which is incorporated by reference.

STATEMENT AS TO THE RIGHTS TO INVENTION MADE UNDER FEDERALLY SPONSORED RESEARCH AND DEVELOPMENT

Not applicable.

BACKGROUND OF THE INVENTION

The present invention relates generally to electronic pest deterrent devices and more particularly to pest deterrent devices that emit ultrasound to drive off animals.

Pests, such as birds, deer, cats, dogs, or rodents among others, can cause significant damage to crops, buildings, stored goods, and landscaping. A variety of methods and devices have been employed to attempt and reduce the damage caused by pests. Some approaches use a scarecrow or replica of a predator, such as an owl or snake, to scare away pests. Unfortunately, pests often become accustom to these devices and they lose their effectiveness.

Other approaches use noise, such as a series of small explosive devices linked to a slow-burning fuse, and/or propane guns to scare away pests. Such methods might be inappropriate in an area where the noise would be bothersome. Additionally, the pests or pest might become accustomed to the repeating noise.

Yet other methods use a detector, such as a motion sensor, to detect the presence of a pest and trigger a pest deterrent event, such as a noise. Many such detectors work automatically, emitting a loud sound or tone when movement is detected. Some pest deterrent devices avoid disrupting human activity or comfort by generating just ultrasound, which is beyond the range of human hearing. However, some pests may still become accustomed to the regular sound, even a fairly loud regular sound. Another issue is that ultrasonic pest deterrent devices can consume a fairly large amount of power to produce high levels of ultrasound. Power consumption is not much of an issue if a power outlet is available, but becomes more of an issue if the deterrent device is operating on battery power. Finally, a user might not be able to tell if the unit is working, i.e. emitting sound, because the sound is above his range of hearing.

Problems associated with power drain can be compounded if the detector keeps triggering off of continuous motion of the pest. Similarly, many detectors, such as passive infrared ("PIR") or Doppler detectors provide low outputs that must be amplified to turn on relatively high-power devices like ultrasound generators. Draw on the power supply and ground current feedback can affect the operation of the detector-amplifier circuit, causing unreliable triggering.

Accordingly, it is desirable to provide an automatic pest deterrent method and apparatus that more effectively drives off pests. It is further desirable that the apparatus be efficient to allow operation in remote locations using battery power. It is yet further desirable that the user be able to verify that the unit is providing sound.

SUMMARY OF THE INVENTION

An efficient pest deterrent device uses a detector that provides a detection signal to a microprocessor. The microprocessor is used to directly generate ultrasound, as well as control the operation and timing of the device. For example, the microprocessor can detect if the device is operated on line or battery power, and change device operation to conserve power when the device is battery-operated. The device can thus operate in a variety of modes. On line power, the device alternates between two ultrasonic tones until a pest is detected, at which point the devices changes the ultrasonic output to a sweeping output. The ultrasonic sweep can be combined with a flash, preferably delayed from the onset of the swept signal by about one second. This delay allows the attention of the pest to be drawn to the ultrasound, and the flash to startle or otherwise drive off the pest. In a further embodiment, the strobe charging circuit's oscillator signal can be used to amplitude modulate ("AM") the ultrasound to create noisy sidebands from high ultrasonic down to within the normal range of human hearing. This AM creates even more disturbing ultrasound and also allows an operator to conveniently verify sonic output but at much lower sound levels than the ultrasound.

In one embodiment, a microprocessor-controlled pest deterrent device has a passive infrared sensor that produces a train of alternating positive and negative pulses that are buffered and amplified. The microprocessor is programmed to initiate pest deterrent signals, i.e. activate a load, when an input voltage signal of a selected polarity rises above a threshold level. The load is not active when the input is below the threshold or of the opposite polarity. The input signal is provided to the microprocessor by an amplifier and is fed back through a coupling capacitor as positive feedback to the input of the operational amplifier, which saturates the operational amplifier. After a selected period of time, the capacitor charges and causes an inverse input signal fed back to the input through the same coupling capacitor, which turns off the load after a selected period of time.

The operational amplifier then saturates to the opposite rail. Again, the output is coupled through the coupling capacitor as positive feedback causing the capacitor to discharge. During this selected discharge period, the load is off and the activation circuitry will not trigger off of a pulse from the sensor or other signal, in other words, the sensor is locked out because the input to the microprocessor is of the wrong polarity for activating the load.

In a particular embodiment, the pest deterrent device includes both a strobe light and ultrasonic speakers. When a pest is detected, the device either initiates ultrasound or changes the ultrasonic output. After a selected period of time, which can be programmed in the microprocessor, the strobe is activated and flashes several times for a brief period and then remains off. In one timing sequence, sweeping ultrasound is activated when a pest is detected and one second later the strobe flashes about five times in one half second. The sweeping ultrasound remains on for an additional one and one-half seconds, thus the deterrent event lasts a total of three seconds. The load is then locked out for a period of time to avoid continuous triggering or even self-triggering, such as by the strobe being detected or electronic noise emulating a triggering event.

In yet another embodiment, a high level of ultrasonic energy is produced by using four ceramic speakers in a series-parallel configuration. Each speaker has a nominal input capacitance of about 0.2 micro-Farads, and the four-speaker series-parallel also has a nominal input capacitance of about 0.2 micro-Farads. This is approximately twice the capacitance of conventional ultrasonic speakers, and achieves a higher peak-to-peak resonant voltage on 12 V battery power or 18 V line power, and over 120 dB of ultrasonic power.

DESCRIPTION OF THE PREFERRED EMBODIMENTS

The present invention provides an ultrasonic pest deterrent. Various operating conditions can be selected depending on the type of power source available (e.g. line power or battery operation), and the ultrasonic deterrent signal can be combined with a flashing light for enhanced deterrent effect. In one embodiment, the ultrasonic signal is initiated when a pest, such as a deer or dog, is detected. A selected period of time lapses before the flash is discharged, thus ultrasound draws the attention of the pest in the direction of the device, and the flash startles the pest. In a particular embodiment, the ultrasonic sound is generated with a microprocessor and the low-frequency flash oscillator AM modulates the ultrasound signal to produce sidebands of ultrasonic signal down to some frequencies within the range of normal human hearing but at much lower levels. This allows an operator to verify that the device is activated and the speakers are on.

I. An Exemplary Pest Deterrent Device

Figure 1:
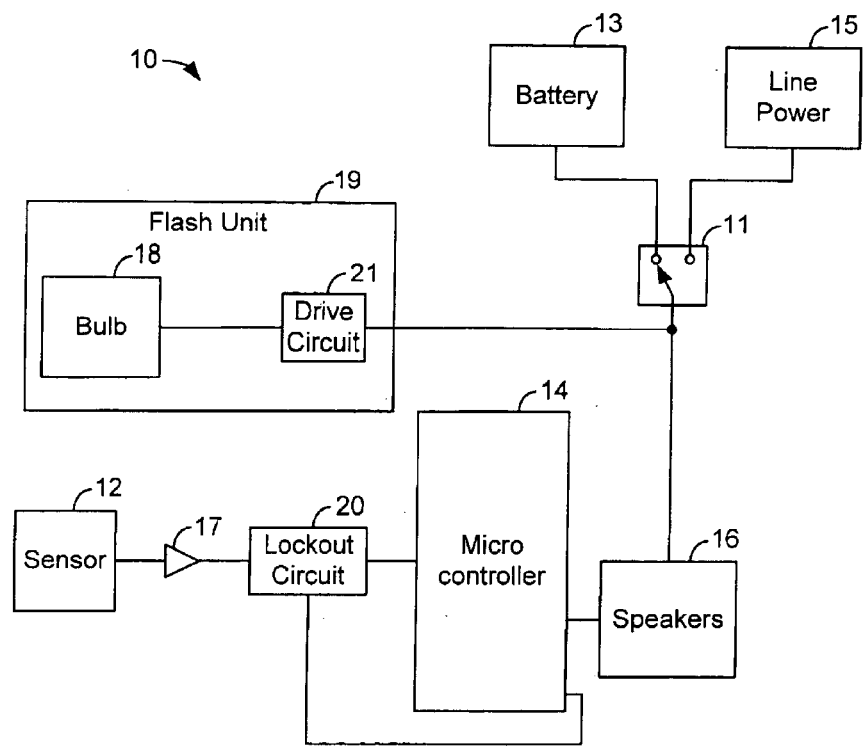
FIG. 1 is a simplified block diagram of a pest deterrent apparatus according to an embodiment of the present invention.

FIG. 1 is a simplified block diagram of an ultrasonic pest deterrent device 10 according to an embodiment of the present invention. A sensor 12, such as a passive infrared ("PIR) sensor is aimed at the location where a pest is expected. Alternative sensing devices, such as Doppler radar devices, could be used. The output of the sensor 12 is provided to a microcontroller 14, which generates the ultrasonic signal that drives the speakers 16 and triggers the strobe or flash unit 19, if selected, which includes the bulb 18 and drive circuitry 21. Power to the unit can be supplied by either batteries 13 or line power 15. The power source can be automatically or manually selected with a switch 11. Line power is stepped down using conventional power supply techniques.

Sensors typically have low output levels that are amplified with high-gain amplifiers 17. These amplifiers can pick up signals that are not generated by the sensor, such as noise or fluctuations in the voltage supplied to the sensor or circuit, and trigger device operation. In particular, when the ultrasonic output or strobe is activated, supply voltage fluctuations, and ground current feedback can cause unintended triggering. A lockout circuit 20 prevents the device from continuously triggering if the pest dwells in the target area or if false triggering events occur, and allows the amplifiers to settle in anticipation of another signal from the sensor.

Figures 2, 2A:
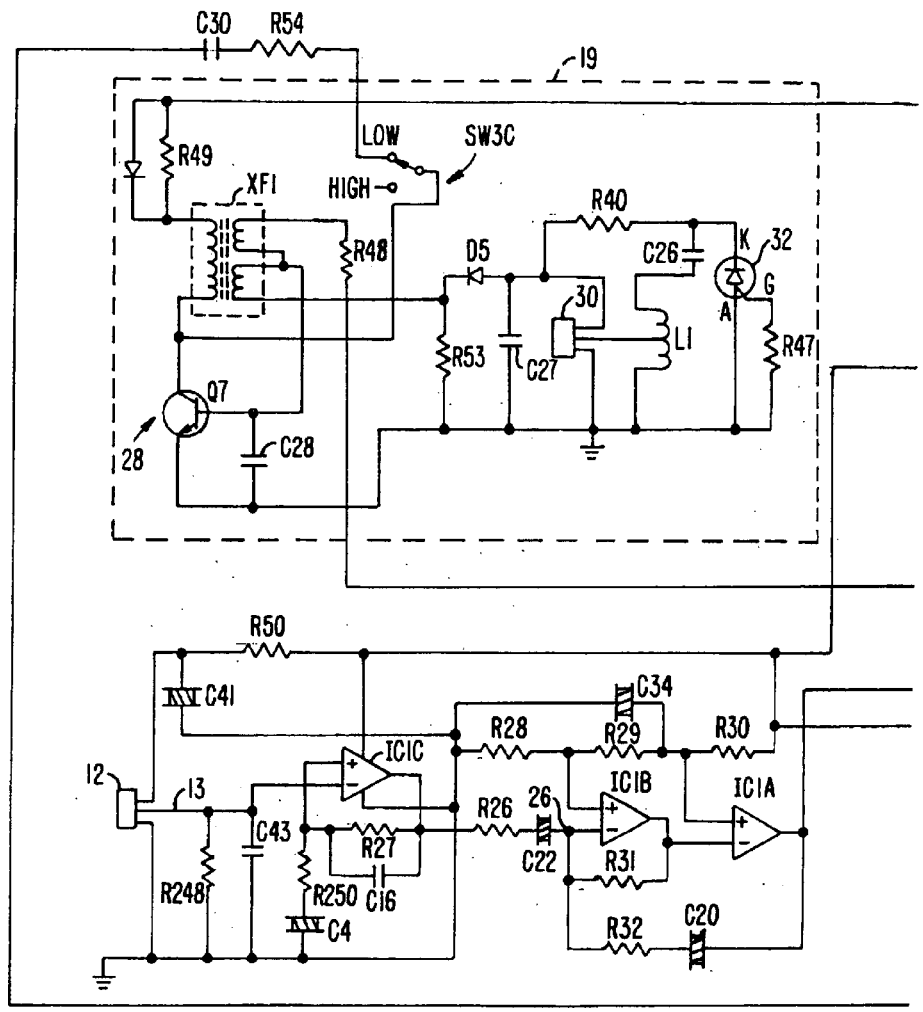
FIG. 2 is a circuit diagram of a pest deterrent apparatus according to an embodiment of the present invention.
Figure 2B:
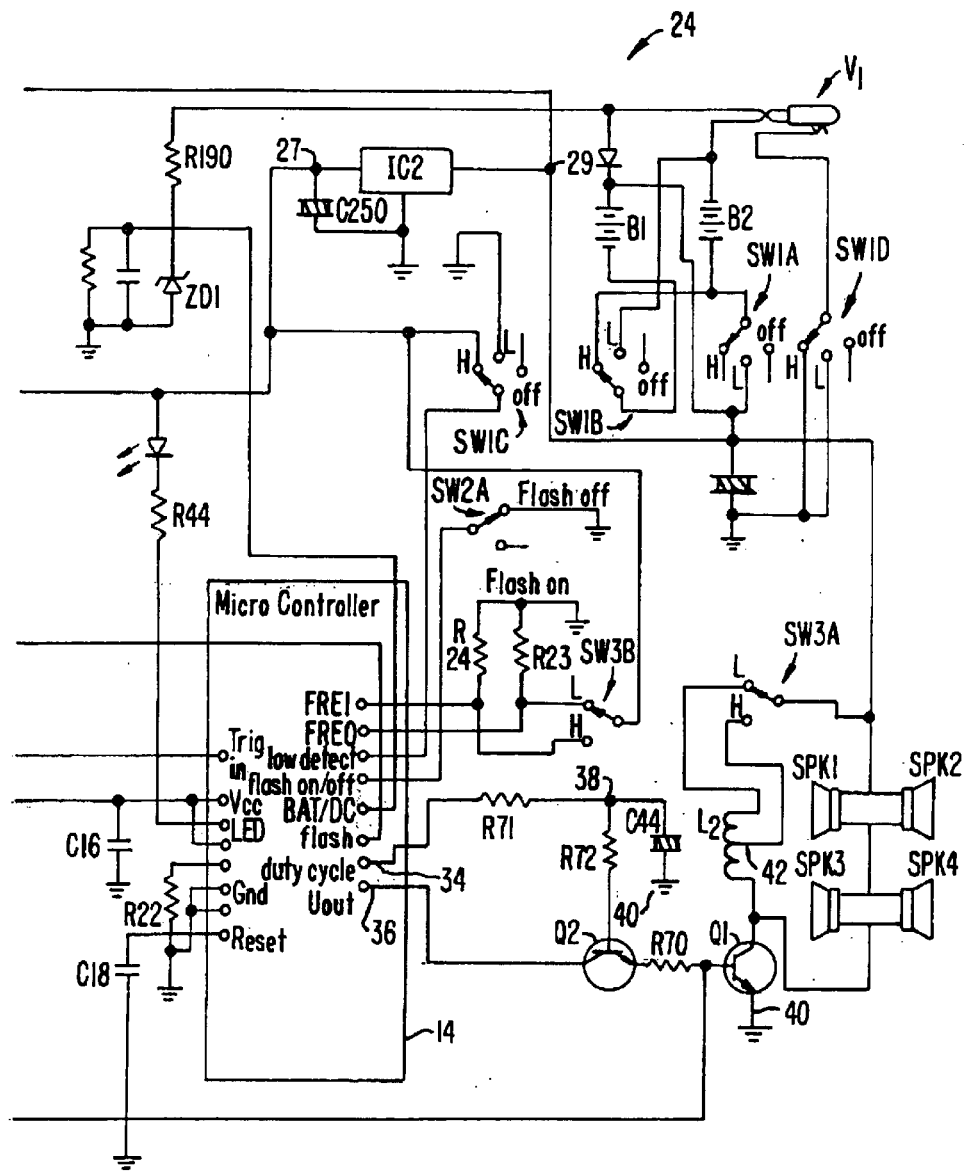

FIG. 2 is an exemplary circuit diagram for a pest deterrent device 24 according to an embodiment of the present invention. Those of skill in the art will appreciate that many alternative circuits and implementations of circuit functions are possible. The sensor 12 is a dual-element PIR sensor that produces positive and negative pulses on the output 13 when motion is detected. The PIR is decoupled from the regulated 5 V power IC2 by a 20 k-ohm series resistor R50 and 1000 micro-Farad filter capacitor C41.

This decoupling and filtering stabilizes the regulated voltage to the PIR and allows the PIR to function even in the event the batteries are producing a lowered voltage, even as low as about 3 volts in some instances. The voltage regulator IC2 provides the unregulated input voltage 29 to the output 27 if the input voltage drops below the regulated voltage. There is only about a 0.1 V drop through the regulator, so if the battery voltage drops below about 5.1 volts, the PIR can still function. This is to maintain functions with low batteries.

The pulse train from the sensor is inputted to the amplifier IC1C, which inverts and amplifies the signal. A 0.1 micro-Farad capacitor C16 in combination with a 1 M ohm resistor R27 sets the gain and the low-frequency bandwidth limit for the detection circuit. The PIR has a relatively low-frequency response, so the amplifier bandwidth is set to about 0.25–10 Hz. This keeps undesirable higher-frequency signals, such as might arise from turning a load on or off, from triggering the circuit.

The output from the first amplifier IC1C drives the second stage amplifier IC1B, which again inverts and further amplifies the signal from the PIR and outputs to a comparator IC1A. Though the output of the second stage amplifier IC1B swings both positive and negative, only the positive excursion (which is subsequently inverted in IC1A) is detected for triggering purposes. This is achieved according to the programming of the microcontroller 14, which is programmed to only activate the load (sound and flash) if an appropriate negative voltage is provided to the trigger input 25. This frees the negative output from IC1B to provide a lock-out function. A quad operational amplifier, such as a model LP324M™ available from NATIONAL SEMICONDUCTOR is used to implement the comparators IC1A, and the amplifiers IC1C and IC1B.

When a positive excursion from the second stage amplifier IC1B is detected, the comparator IC1A swings negative to turn on the load (i.e. to activate the ultrasound and strobe, if selected). This negative swing is fed back through a 2.2 micro-Farad feedback capacitor C20 through a series resistor R32 to the summing junction 26, which is the negative input of the second stage amplifier IC1B. This negative signal provided to the negative input pulls the output of the second stage amplifier IC1B further up towards saturation, providing positive feedback. The saturation condition is held until the summing junction voltage is compensated through the feedback resistor R31 (i.e. until the feedback capacitor C20 is sufficiently charged through R31 to pull the second stage amplifier back from saturation).

After the feedback capacitor C20 is fully charged, the summing junction returns to a quiescent state, which switches the output of the second comparator IC1A positive. This positive swing is again fed back through the feedback capacitor C20 and the series resistor R32 to the summing junction 26, which causes the output of the second stage amplifier IC1B to swing to negative saturation because of the positive feedback, essentially disabling the triggering operation. The load is now off and the second stage amplifier IC1B cannot trigger the load to come on again until the feedback capacitor C20 is discharged through the feedback resistor R31. Thus, the circuit acts as a timer for determining how long triggering is locked out after the load is turned off, and provides a selected, positive, load on gate, trigger signal to the microcontroller 14.

In one embodiment, the time the load is kept on is controlled according to the microprocessor programming. In other words, upon receiving a trigger input of the proper polarity, the microcontroller turns on the load for a selected period of time, such as about three seconds. In another embodiment, the microcontroller or other circuitry activates the load as long as the trigger signal has the proper polarity and is above a threshold voltage, for example, as long at the trigger signal is a negative voltage. In one embodiment a three-second-time constant is chosen for the lock out period; however, the lock out period does not have to equal or even be close to the load-on period. It is generally desirable that the lock out period hold off the triggering circuit long enough after the load is turned off so that fluctuations in the supply voltage, ground potential, or even light from the strobe or other non-pest input to the sensor, does not create a false trigger. If the load-on period is determined by the duration of the trigger input signal (i e. R31–C20 time constant), a different lock-out period could be obtained by placing a diode and resistor in parallel to each other, the parallel combination being placed in series in the feedback path. As described above, the output of the second stage amplifier can swing both positive and negative, so the feedback capacitor C20 should be a non-polarized capacitor.

The lock out or hold off time after the load goes off insures that the power supplies and the motion sensor signal amplifiers have all settled before motion detection is turned back on. The lock out period also eliminates continuous motion detection and extends battery-operated lifetime. The 10 k-ohm series resistor R32, which is placed close to the summing junction 26 on the printed circuit board, isolates the summing junction from noise that might be picked up on the traces between the series resistor R32 and the trigger input 25. This resistor has little effect on timing because it is much smaller than the 470 k-ohm feedback resistor R31.

The pest deterrent device can operate in a variety of modes. A power switch SW1A–SW1D allows the user to select between a high-power mode or a low-power mode. A bayonet plug connector V1 further selects between battery operation or line-voltage operation using an 18 V DC adaptor input from a 115 V line supply. Plugging in the male bayonet plug automatically switches out the batteries and provides a control signal to the microprocessor 14 to switch from battery-operated mode to line power mode.

The unit operates at 100% load duty cycle in high power mode, enabling the load only when motion is detected (for the 3-second on, 3-second lockout periods). In high-power battery operated mode, the six-volt batteries B1, B2 are connected in series to provide twelve volts to the circuit. When high-power mode is selected and the device is running on battery power, the unit operates at 100% duty cycle, only enabling the load when motion is detected. In high power mode using the power adaptor from line power, the unit continuously emits ultrasound, with a change in the ultrasound when motion is detected. In low-power battery operation, the unit operates at 50% duty cycle, with the two batteries connected in parallel to provide 6V to the circuit. This improves battery lifetime, but produces lower ultrasonic power. The load is cycled on and off at a frequency of about 20 Hz. In low-power operation running on line power, the unit operates at 50% duty cycle emitting a continuous noise, with a change in the ultrasound when motion is detected.

A sound switch SW3A–SW3C allows selection between a partially audible (to humans) low ultrasonic mode output and a high ultrasonic mode output. In low ultrasonic mode on battery power, when motion is detected, the unit sweeps from 15 kHz to 25 kHz once per second for 3 seconds. The sweep is not a continuous sweep, but is carried out in a series of eight steps. Different sweeps or steps could be used, and the sweep could be generated by an analog circuit in alternative embodiments. Similarly, the ultrasonic signal could be produced by an external oscillator or other device that is controlled by the microcontroller or other control circuitry.

Experiments with mice were conducted to evaluate the effectiveness of a single, continuous ultrasonic tone versus the stepwise swept signal. From these observations it is believed that changes in the ultrasonic signal is a more effective deterrent than a continuous tone. The microprocessor 14 is programmed to generate the ultrasonic signal directly, which is amplified to drive the speakers. The microcontroller has sufficient bandwidth to generate ultrasonic frequencies. In one embodiment the microcontroller is a custom-masked microcontroller with 128 bytes of random access memory ("RAM) using a 4 MHz crystal-controlled oscillator for the clock. Other types of microcontrollers could be used, such as microcontrollers with integrated flash memory or programmable read-only memory ("PROM") programmed with the operating code, or the microcontroller can interface with an external memory chip or module that has been programmed to configure the microcontroller to operate in the desired fashion. Other types of clocks or other clock frequencies compatible with the microcontroller and sufficiently high for direct generation of the highest desired ultrasonic frequency could be used if the microcontroller generates the ultrasound.

A flash select switch SW2A turns the flash on or off according to a control signal (in this case ground or open) supplied to the microcontroller. The flash can be enabled in any mode. A 20 kHz flash oscillator 28 charges the 2.2 micro-Farad, 250 V flash capacitor C27 and 0.047 micro-Farad 200 V flash trigger capacitor C26 until sufficient voltage is reached to discharge the strobe tube 30. The strobe flashes five times in about one half second, according to the time constant of the flash trigger capacitor C26 and 3.3 M-ohm series resistor R40. In low ultrasonic mode, the flash oscillator is connected to the ultrasonic output through a 2 k-ohm series resistor R54 and 0.1 micro-Farad Farad series capacitor C30, and further modulates the output signal provided to the speakers by modulating the gate voltage of amplifying transistor Q1. The amplitude modulation produces sidebands above and below the ultrasonic frequencies being generated and some within the audible range. This audible portion of the output can be used to verify that the unit is on and operational. Furthermore, it is believed that the noise generated by the amplitude modulation makes the sound emitted by the speakers more disagreeable to pests, thus improving the effectiveness of the pest deterrent.

In low ultrasonic mode on line power, the unit continuously generates a signal switching between 17 kHz and 18 kHz at a rate of about 20 Hz. When motion is detected, the unit step-wise sweeps from 15 kHz to 25 kHz once a second for about 3 seconds. After the 3-second sweep period, the unit returns to the quiescent state of alternating between 17 kHz and 18 kHz at a rate of 20 Hz until another trigger from the sensor enables the load (i.e. another triggering event after the lock-out period).

In high ultrasonic mode running on batteries, the unit sweeps from about 25 kHz to 40 kHz once per second for three seconds. Some animals do not respond to the high end of this range, and in other embodiments, the unit steps from 24–25 kHz, or 20–30 kHz. Other ranges and step sizes may be selected. In another embodiment, using line power, the unit continuously generates a signal switching between 31 kHz and 32 kHz until motion is detected. When motion is detected, the unit sweeps from 25 kHz to 38 kHz (or other range) for three seconds, and then returns to alternating between 31 kHz and 32 kHz.

II. Operation of the Flash Circuit and Duty Cycle

When the flash is selected, the strobe flashes five times for half a second starting one second after motion is detected. Thus, as soon as motion is detected the ultrasonic signal is generated or changes from a quiescent state (e.g. alternating 17/18 kHz or 31/32 kHz), but the flash does not strobe until the sound has been on for about one second. This provides an opportunity for the pest to direct its attention at the device before the flash comes on. It is believed that this combination of sound and flashing light with an intervening period is a more effective deterrent than if the flash started concurrently with the sound because the pest would not have an opportunity to look at the device before the flash started.

If the unit is in low ultrasound mode, a further advantage is obtained from the amplitude modulation of the low ultrasound signal by the flash oscillator. Namely, when the flash oscillator is enabled, an additional change in the sound output occurs as the AM sidebands are produced. This produces a very disturbing sound from as low as about 4 kHz to over 30 kHz that occurs during, and as a function of, strobing.

The flash oscillator transistor Q7 uses feedback from the transformer XF1. The high voltage output of the transformer XF1 is rectified by the diode D5 and charges the flash capacitor C27. As the flash capacitor charges, the flash trigger capacitor C26 also charges through the resistor R40. The flash trigger capacitor C26 is in series with the trigger transformer L1. When the voltage at the cathode K of the programmable uni-junction transistor ("PUT") 32 drops low enough, the PUT turns on, discharging the series capacitor C26 through the trigger transformer L1. This current creates the trigger voltage to fire the flash and discharge the flash capacitor C27 through the strobe tube 30. The flash capacitor C27 immediately starts re-charging, and the cycle starts over with the resistor R40 and series capacitor C26 controlling the flash strobing rate. The flash oscillator 28 is turned on and off by the microcontroller 14 through a flash control line 31.

When low-power operation is selected, the microcontroller 14 generates a low-frequency square wave at the duty cycle output 34 to drive a bipolar transistor Q2 on and off. This transistor is in series with the ultrasonic output 36 of the microcontroller and the output amplifier Q1. The edges of the square wave are rolled off by 1 k-ohm resistors R71, R72 in series with the base of Q1, and the 1 micro-Farad capacitor C44 connected between a center node 38 of the resistors and ground 40. The square wave edges are rolled off to prevent clicking in the speakers as the ultra sound is gated on and off.

III. Output Driver and Speakers

The output amplifier Q1 is turned on and off by the ultrasonic output 36 from the microcontroller 14. External resistors R23, R24 allow changing the high and low frequencies generated by the microcontroller without having to re-program the microcontroller. The tapped inductor L2 forms a resonant circuit with the speakers SP1, SP2, SP3, and SP4 to ring them with a sine wave. The speakers are bi-morph ceramic speakers with a frequency response from about 4 kHz up to about 40 kHz and are connected in series-parallel. In other words, two sets of two parallel speakers are connected in series. In the low range, the speakers are connected across the entire center-tap inductor L2, while in the high range the speakers are connected to the tap 42 of the inductor L2 for a lower inductance. The switch SW3A, SW3B is a mechanical two-position switch, but electronic switching of the inductance could be done to broaden the range of frequency sweeping using several inductors and taps, or variably-tunable inductors could be used.

By connecting the speakers in a series-parallel configuration higher output power is achieved. Each speaker has a capacitance of about 0.2 micro-Farads, which is twice the capacitance used in a conventional ultrasonic speakers that typically have a capacitance of about 0.05–0.1 micro-Farads. The series-parallel arrangement of the speakers provides a combined capacitance of 0.2 micro-Farads. This allows more current draw and more power to be drawn by the speakers, and more sonic power to be directed at the pest. Similarly, while most speakers in conventional ultrasonic pest deterrent devices are driven at about 20V peak-to-peak, producing about 90–100 dB total sonic power, the present circuit, utilizing a combined total 0.2 micro-Farad speaker load and achieving about 50 V peak-to-peak when in resonance with L1, produced over 120 dB. In another embodiment, the total ultrasonic output level was over about 110 dB.

The ultrasonic output of a unit fabricated according to the present invention generated over 120 dB measured 18 inches from the speakers at same ultrasonic frequencies. Not all the ultrasonic power could be focused on the point of measurement, so it is believed that the actual ultrasonic output power is well over 120 dB. Using either a 12 V battery or 18 V line source also increases the power available to the speakers over conventional 6 V or 12 V designs.

IV. An Exemplary Timeline and Methods

Figure 3:
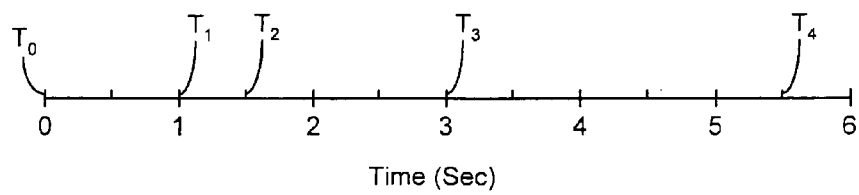
FIG. 3 is a simplified representative time line illustrating a pest deterrent process according to an embodiment of the present invention.

FIG. 3 is a representative timeline illustrating the operation of a pest deterrent device with the flash enabled according to an embodiment of the present invention. The sensor detects the presence of a pest at T0 and generates a series of alternating positive and negative pulses. Essentially instantaneously the ultrasound is turned on, if originally off, or changed to a sweep from an alternating tone, depending on the mode of operation. After one second T1, the flash flashes for about one-half second until T2, which is at 1.5 seconds. The sweeping ultrasound remains on for an additional 1.5 seconds (three seconds total) until T3. The sensor is than locked out of triggering the load for a period of about 2.5 seconds, allowing the trigger sensing amplifiers to settle after the load(s) is turned off, until T4, which occurs at 5.5 seconds. After the lock-out period the cycle can re-start if the sensor detects another or the same pest. These times are merely exemplary.

Figure 4:
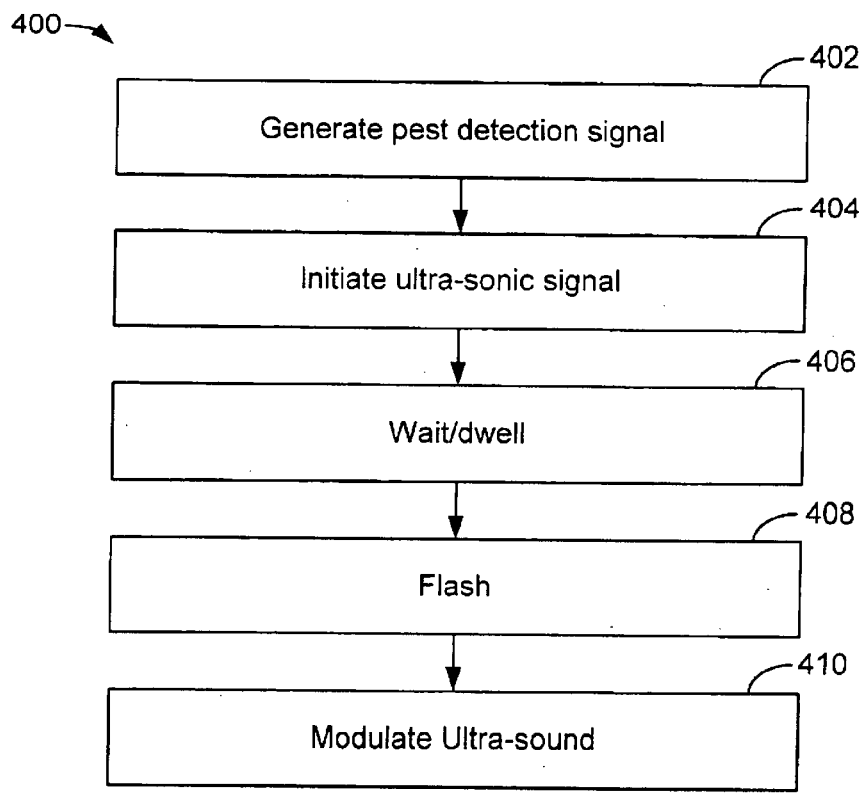
FIG. 4 is a simplified flow chart of a pest deterrent process according to an embodiment of the present invention.

FIG. 4 is a simplified flow chart of a pest deterrent process 400 according to an embodiment of the present invention. A sensor generates a pest detection signal (step 402) that initiates an ultrasonic signal (step 404) at a pest deterrent unit. After waiting a selected period of time (step 406), for example about 1 second, a light flash(es) is generated (step 408) at the pest deterrent unit. In a further embodiment the ultrasonic signal is amplitude modulated by the flash oscillator signal during the period the light is flashing (step 410). It is intended that the ultrasonic signal attracts the attention of the pest to the pest deterrent unit, and that the flash then startles the pest to drive it away.

Figure 5:
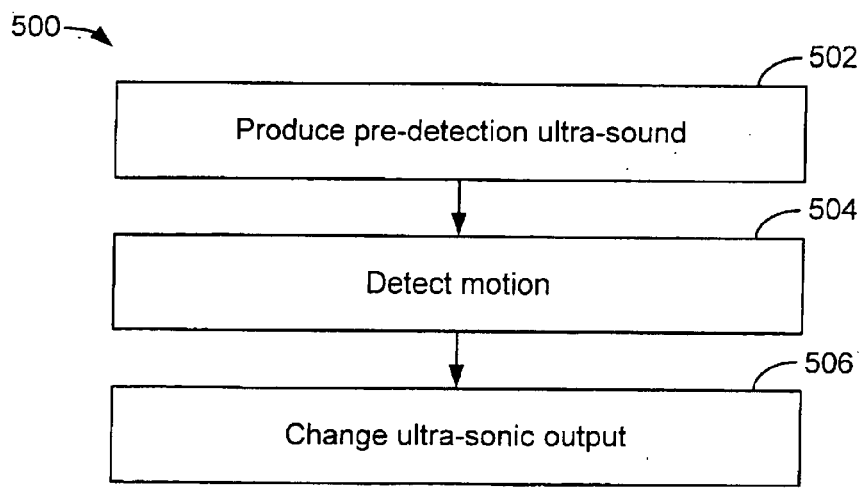
FIG. 5 is a simplified flow chart of a pest deterrent process according to another embodiment of the present invention.

FIG. 5 is a simplified flow chart of a pest deterrent process 500 according to another embodiment of the present invention. A pest deterrent unit produces a first ultrasonic output prior to motion being detected (step 502). For example, the unit could produce a continuous tone or alternating high-low tones. When motion is detected (step 504), the unit changes to a second ultrasonic output (step 506), such as a swept (frequency) ultrasonic signal, amplitude modulated ultrasonic signal, or chopped (on/off) ultrasonic signal.

Figure 6:
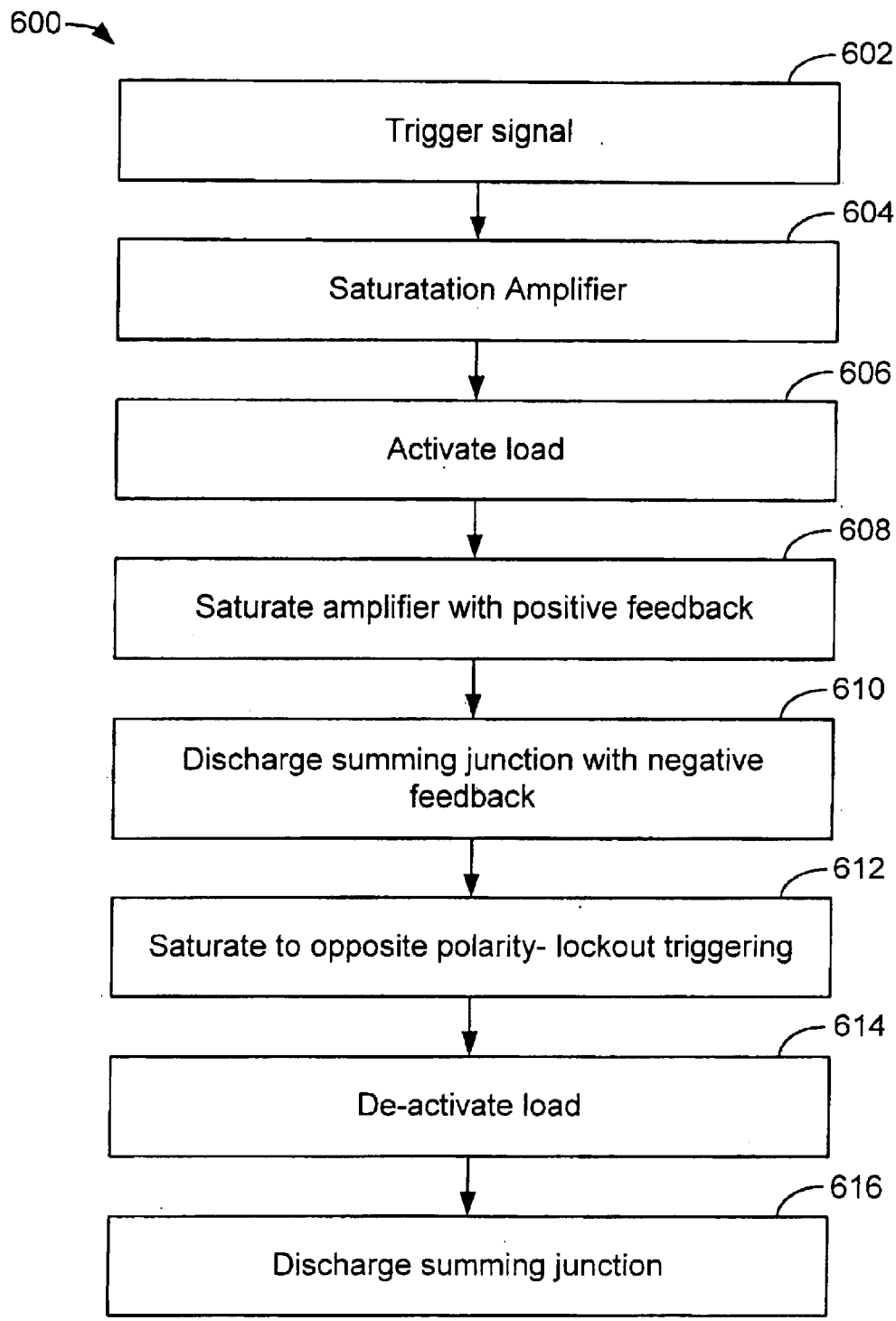
FIG. 6 is a simplified flow chart of a triggering process according to an embodiment of the present invention.

FIG. 6 is a simplified flow chart of a signal triggering process 600 according to another embodiment of the present invention. When movement occurs within the range of a motion sensor, the sensor generates a trigger signal having a first polarity (i.e. positive or negative) (step 602). The trigger signal is provided to a saturating amplifier (step 604) capable of producing a positive or a negative output voltage and a load is activated (step 606). Positive feedback is provided to the saturating amplifier to drive the amplifier to a first saturation voltage (step 608). Positive feedback from the first saturation voltage is provided through an inverter and a feedback capacitor to a summing junction input of the saturating amplifier and negative feedback from the output of the saturating amplifier is provided to the summing junction through a feedback resistor (step 610), which discharges the feedback capacitor at a first selected rate.

After a selected period of time, the voltage at the summing junction drops below a first threshold voltage and the saturating amplifier provides a second saturation voltage having the opposite polarity from the first saturation voltage (step 612). The load, which is only enabled if a signal with the first polarity is detected, is de-activated (step 614). Positive feedback from the second saturation voltage is provided through the inverter and the feedback capacitor to the summing junction input of the saturating amplifier, and negative feedback is provided from the output of the saturation amplifier to the summing junction input through the feedback resistor to discharge the feedback capacitor at a second selected rate (step 616), wherein a second trigger signal will not activate the load until after the load is de-activated and the voltage at the summing junction drops below a second threshold voltage. The term "below" relates to the absolute value of the voltage(s) at the summing junction.

The rate of compensation in one embodiment is essentially equal, that is, the high and low saturation voltages have about the same magnitude and only a feedback resistor is used to couple negative feedback to the summing junction. In an alternative embodiment, the saturation voltages might not be symmetrical, and in yet other embodiments, a diode (or diode with a series resistor) can be placed in parallel between the output of the saturating amplifier and the summing junction.

Although the present invention has been described with reference to specific embodiments, modification and variation can be made without departing from the subject of the invention as defined in the following claims. For example, a sound detector, vibration detector, or radar detector might be used instead of a PIR as the pest detector. Further, the load, although described in specific embodiments as a series-parallel combination of high-capacitance ceramic speakers could be other types of speakers or ultrasonic devices. Similarly, although specific circuits with specific values of components have been described, other circuits, component values, and types of devices could be used, such as by using analog circuits to provide some of the functionality of the microprocessor in certain embodiments.

We claim:

1. A pest deterrent device comprising:
    a sensor capable of detecting a pest;
    a trigger circuit electrically coupled to the sensor, the trigger circuit providing a triggering signal having a first polarity in response to a triggering event, the trigger circuit activating a load during the triggering signal, the triggering signal being coupled to a summing junction through a capacitor as positive feedback;
    a negative feedback path electrically coupling an inverse triggering signal to the summing junction to discharge the capacitor and turn off the triggering signal and the load after a triggering period, the trigger circuit providing a lockout signal following the triggering signal, the lockout signal being coupled to the summing junction through the capacitor as positive feedback and an inverse lockout signal being coupled to the summing junction as negative feedback to lock out the load until the lockout signal is turned off after a lockout period.

2. The pest deterrent device of claim 1 wherein the sensor produces both a positive pulse and a negative pulse upon detection of a pest, only one of the positive pulse or the negative pulse triggering the load.

3. The pest deterrent device of claim 1 wherein the trigger circuit includes a first amplifier providing a first output and a second amplifier providing a second output, the first output being the inverse triggering signal and being coupled to an inverting input of the second amplifier, the second output being the triggering signal.

4. The pest deterrent device of claim 1 wherein the negative feedback path includes a resistor in parallel with a diode.

5. The pest deterrent device of claim 4 wherein the negative feedback path further includes a second resistor in series with the diode and in parallel with the resistor.

6. A pest deterrent device comprising:
    a sensor capable of detecting a pest;
    a trigger circuit electrically coupled to the sensor, the trigger circuit providing a triggering signal having a first polarity in response to a triggering event, the trigger circuit activating a load during the triggering signal, the triggering signal being coupled from an output of an inverting amplifier to a summing junction of a second inverting amplifier through a capacitor as positive feedback;
    a negative feedback path electrically coupling an inverse triggering signal from a second output of the second inverting amplifier to the summing junction to discharge the capacitor and turn off the triggering signal and the load, the trigger circuit providing a lockout signal following the triggering signal, the lockout signal being coupled from the output of the first inverting amplifier to the summing junction through the capacitor as positive feedback and an inverse lockout signal being coupled from the second output of the second inverting amplifier to the summing junction as negative feedback to lock out the load until the lockout signal is turned off.

7. A method of locking out a detector circuit, the method comprising:
    providing a detection signal from the detector circuit to a saturation amplifier;
    producing a first saturated output signal from the saturation amplifier, the first saturated output signal having a first electrical polarity;
    electrically coupling the first saturated output signal to an inverting input of a second amplifier;
    inverting the first saturated output signal to produce a triggering signal having a second electrical polarity and being configured to activate a load;

electrically coupling the triggering signal through a capacitor to an inverting summing junction of the saturation amplifier;

electrically coupling the first saturated output signal to the inverting summing junction of the saturation amplifier;

discharging the inverting summing junction to turn off the triggering signal and the load after a trigger period;

producing a second saturated output signal from the saturation amplifier, the second saturated output signal having the second electrical polarity;

inverting the second saturated output signal to produce a lockout signal having the first electrical polarity and being configured to de-activate the load;

electrically coupling the lockout signal through the capacitor to the inverting summing junction of the saturation amplifier;

electrically coupling the second saturated output signal to the inverting summing junction of the saturation amplifier;

discharging the inverting summing junction to turn off the lockout signal after a lockout period.

8. The method of claim 7 wherein the lockout period is essentially equal to the trigger period.

* * * * *